United States Patent [19]

Kimura

[11] Patent Number: 4,885,198

[45] Date of Patent: Dec. 5, 1989

[54] SHEETS FOR USE IN CORRESPONDENCE

[76] Inventor: Yoshikazu Kimura, 36 Takada-cho, Karahashi, Minami-ku, Kyoto 601, Japan

[21] Appl. No.: 222,548

[22] Filed: Jul. 21, 1988

[30] Foreign Application Priority Data

| | | | |
|---|---|---|---|
| Jul. 31, 1987 | [JP] | Japan | 62-193028 |
| Feb. 22, 1988 | [JP] | Japan | 63-39106 |
| Feb. 22, 1988 | [JP] | Japan | 63-39107 |

[51] Int. Cl.[4] .......... B32B 3/04; B32B 3/06

[52] U.S. Cl. .......... 428/77; 428/124; 428/136; 428/192; 428/194; 283/101; 283/103; 283/106; 283/110

[58] Field of Search .......... 428/121, 124, 192, 194, 428/77, 136; 283/98, 99, 100, 106, 110, 109, 101, 103, 105; 229/92.8

*Primary Examiner*—Alexander S. Thomas

*Attorney, Agent, or Firm*—Fidelman & Wolffe

[57] ABSTRACT

Sheets for use in correspondence which can be used for postcards, etc. are disclosed. The correspondence sheets consist of twice-folded sheet displaying information on the inside, clear resin films coated on the inside each-other-facing surfaces of the twice-folded sheet in a manner that they can hardly be peeled off, and a temporary adhesive layer which connects the each-other-facing clear resin films in a manner that they can be later peeled off and also the peeled surface thus formed has no tackiness. The sheets will be peeled off at the temporary adhesive layer by the receiver, and the peeled surface on each side after the unfolding is covered with clear resin film having no tackiness.

4 Claims, 6 Drawing Sheets

(A)

(B)

SHEETS FOR USE IN CORRESPONDENCE

BACKGROUND OF THE INVENTION

The present invention relates to sheets for use in correspondence which can be used for postcards, etc..

Japan Kokai Jitsuyo Shinan Koho JP 49/33930 discloses a joined postcard which consists of two postcard-like sheets of paper adhered to each other in a manner that they can be peeled off. This joined postcard can indicate a written message and other information on the inside of each sheet of paper.

However, each sheet of paper of the above-mentioned joined postcard is independent to each other; hence it is hard for the sender to show continuously over the both sheets, specific information such as letters diagrams, graphs, pictures, etc.: even if the continuous indication on the inside of both sheets is possible, both sheets will be completely separated when they are peeled off and unfolded by the receiver; hence the continuity of information has been lost giving inconvenience for their filing and storing, the inside of both sheets being not effectively and continuously utilized.

Furthermore, both sheets or one of them have some tackiness on the peeled surface even after the peeling and unfolding of the sheets by the receiver, with the result that the receiver has some troubles in their storing and filing as well as some unpleasant feeling in handling.

Therefore, the object of the present invention is to provide sheets for use in correspondence which can indicate easily and continuously over the sheets specific information from the sender, and can keep the continuity of information with no separation of both sheets even after the peeling and unfolding of the sheets by the receiver: the sheets should have no such unpleasant tackiness on the surface peeled, and hence be very convenient for storing and filing.

SUMMARY OF THE INVENTION

The correspondence sheets derived from the present invention consist of twice-folded paper, clear resin film coated so strongly as not to be peeled off on the inside faces of the each-other-facing sheets, and a temporary adhesive layer which adheres the each-other-facing clear resin films in a way that they can be later peeled off and the peeled surface will not be tacky.

The above-mentioned twice-folded paper can be formed from the computer output paper. The thermoplastic resins such as polyethylene, polypropylene, and polyester can also be suitably used as the above-mentioned clear film.

The above-mentioned temporary adhesive layer can be one or two layers formed between the two clear films when clear resin films of different or same kind, or clear resin films of same kind which are different in properties such as melting point adhere to each other by required heat treatment or chemical treatment, or further by putting binding materials between the films as required, so that a proper low adhesive power can be given to make the peeling possible.

The manner and the behavior of the temporary adhesion between such resin films are disclosed in Japan Jitsuyo Shinan Koho 57-60036 or Japan Kokai Jitsuyo Shinan Koho 62-9280.

As to the manufacturing method for the correspondence sheets, there is a method where clear resin films are unified in advance with a temporary adhesive layer put between them, the laminated block is placed between the twice-folded sheets whose inside surface displays requested information such as correspondence, diagrams, graphs and pictures, and then the outside surface of each clear film adheres to each inside surface of the twice-folded sheet by heat-sensitive or pressure-sensitive adhesives in a manner that they are hardly peeled off.

As to the manufacturing method for a large number of correspondence sheets indicating same information as in the case of direct mailing, the following method can be well adopted: in the method, clear resin film is coated in advance on the sheet where specific information is indicated repeatedly before the sheet is cut and twice-folded; the said resin-coated sheet is twice-folded with the clear resin film surface inside; the each-other-facing clear resin films then adhere by the heat treatment with heat roller, etc. in a manner that they can be peeled off; then the sheet is cut to a specific dimension.

The above-mentioned correspondence sheet will be peeled off at the temporary adhesive layer by the receiver, and the peeled surfaces on both sides after unfolding are in a state covered by the clear resin film. The surface of the clear resin film has no tackiness; the resin improves the beauty of the information display, and protects the display from outside friction, pollution, water, etc..

DETAILED DESCRIPTION OF THE PREFERRED EMBODIMENTS

Figure 1:
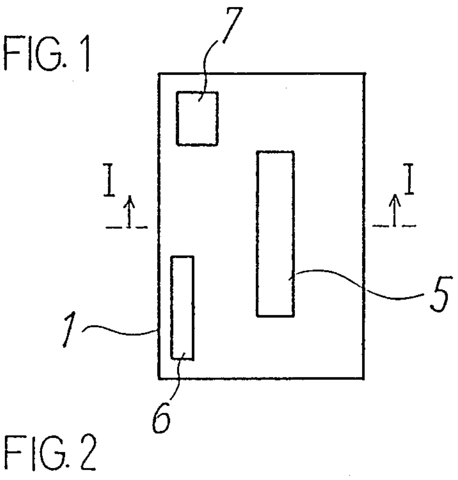
FIG. 1 and FIG. 2 are an ichnograph of the correspondence sheet of the present invention and a cross section enlarged at I—I line respectively.
Figure 2:
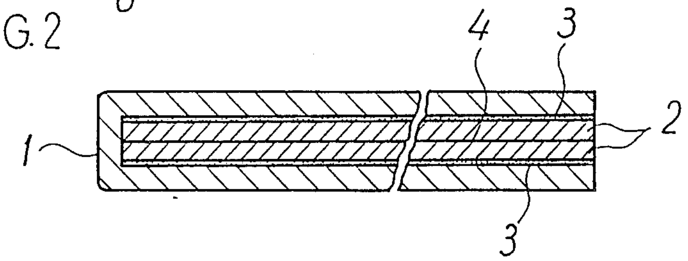

In FIG. 1 and FIG. 2, the clear resin films 2 are coated via adhesive layers 3 onto the inside surfaces of the twice-folded sheet 1, which has information (not indicated in the diagram) of correspondence, pictures, etc. displayed on its inside, in a manner that they can hardly be peeled off; on the other hand, the each-other-facing clear resin films 2 are adhered via the temporary adhesive layer 4 (indicated by the boundary line) in a manner that they can be peeled off later.

The correspondence sheets thus formed, as shown in FIG. 1, can be used as mail by typing address 5 and return address 6 on their obverse and by putting a stamp 7 on them.

Figure 3:
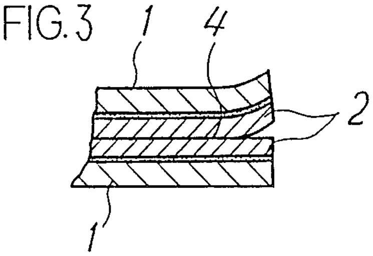
FIG. 3 and FIG. 4 are cross-sections showing the states of the correspondence sheet shown in FIG. 2 at the time of peeling and after unfolding respectively.
Figure 4:
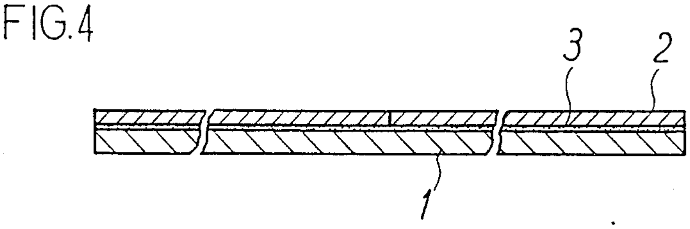

The correspondence sheet sent to the receiver, as shown in FIG. 3, will be peeled off from the end part of the temporary adhesive layer 4, and then will be unfolded as shown in FIG. 4. The correspondence sheet unfolded is covered by the clear resin film 2 on both sides, and the peeled surface of the clear resin film 2 has no tackiness.

Figure 5:
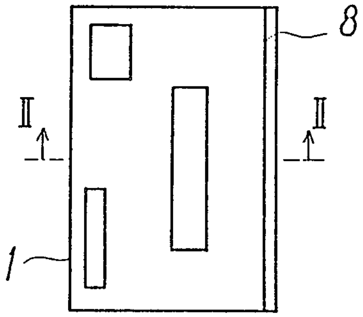
FIG. 5 and FIG. 6 are an ichnograph of the other correspondence sheet of the present invention and a cross section enlarged at II—II line respectively.
Figure 6:
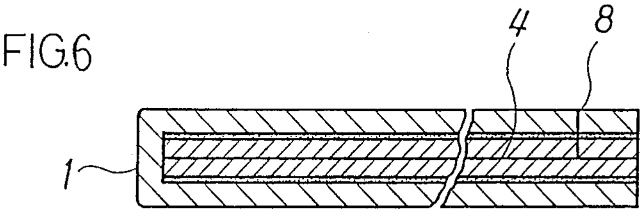
Figure 7:
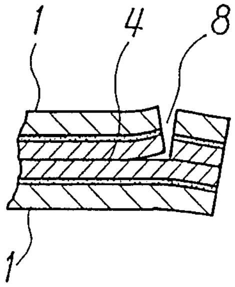
FIG. 7 is a cross section showing the state of the correspondence sheet at the time of peeling.

The correspondence sheet shown in FIG. 1 and FIG. 2 may have, along the edge line of the twice-holded sheet 1, continuous or non-continuous slits whose depth is from the surface of the sheet to the temporary adhesive layer 4, as shown in FIG. 5 and FIG. 6.; the correspondence sheet can be easily peeled off at the temporary adhesive layer 4 by opening wide the slit 8 as shown in FIG. 7.

Figure 8:
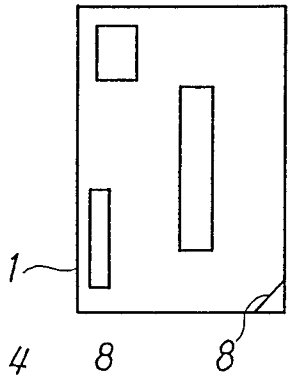
FIG. 8 is an ichnograph of the correspondence sheet which is one partly changed from the sheet shown in FIG. 5.

The slit 8 is located along the edge line, but may be placed on the other position, for instance on the corner of the sheet as shown in FIG. 8. By the way, especially for the continuous slit 8 of the twice-folded sheet, some pressure-sensitive adhesive tape (not indicated in the diagram) may be used to protect the correspondence sheet from the unexpected or spontaneous peeling from the slit.

Figure 9:
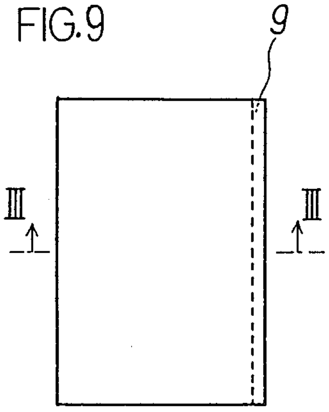
FIG. 9 and FIG. 10 are an ichnograph of the other correspondence sheet of the invention and a cross section enlarged at III—III line respectively.
Figure 11:
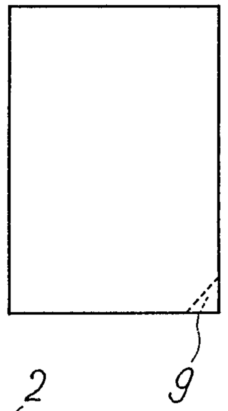
FIG. 11 is an ichnograph of the correspondence sheet which is one partly changed from the sheet shown in FIG. 9.
Figure 10:
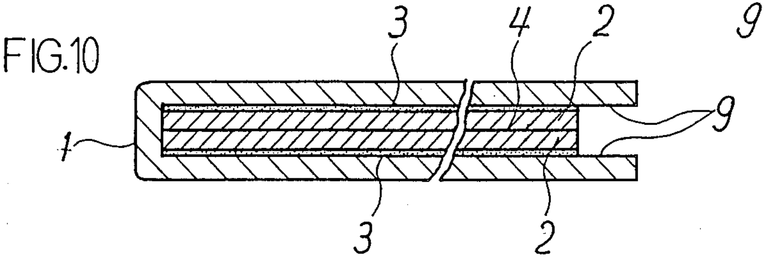

Furthermore, in the correspondence sheet shown in FIG. 1 and FIG. 2, the non-adhesive region 9 where no clear resin film 2 is coated as shown in FIG. 9 and FIG. 10 may be placed along the edge line on each inside surface of the each-other-facing twice-folded sheet. At least one part of the edge line of the above-mentioned sheet is longer than and stands out from the ends of the clear resin film 2 and of the temporary adhesive layer 4, with the result that the peeling procedure is easier. The non-adhesive region 9 is placed along the edge line of the sheet, but may be also located on the other position, for instance on the corner of the twice-folded sheet as shown in FIG. 11.

Figure 12:
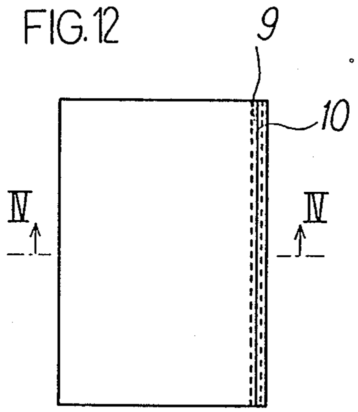
FIG. 12 and FIG. 13 are an ichnograph of another correspondence sheet of the invention and a cross section enlarged at IV—IV line respectively.
Figure 15:
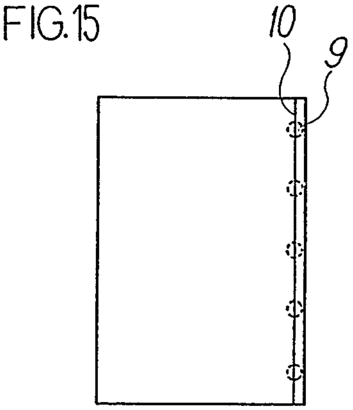
FIG. 15 is an ichnograph of the correspondence sheet which is one partly changed from the sheet shown in FIG. 12.
Figure 13:
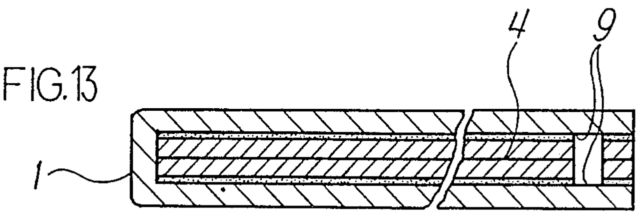
Figure 14:
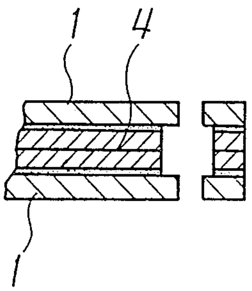
FIG. 14 is a cross section showing the state of the sheet shown in FIG. 13 at the time of peeling.

The above-mentioned non-adhesive region 9 may also be positioned at places somewhat apart to the inside from the end along the edge line of the twice-folded sheet, as shown in FIG. 12 and FIG. 13. This sheet will be cut along the non-adhesive region 9 as shown in FIG. 14 by the receiver, to get a state of being easily peelable as shown in FIG. 10. The above-mentioned non-adhesive region 9 may be set non-continuously as shown in FIG. 15. It is desirable to put the cutting mark 10 showing the cutting position on the edge line of the twice-folded sheet 1.

Figure 16:
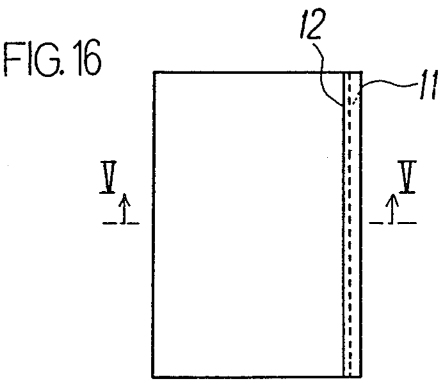
FIG. 16 and FIG. 17 are an ichnograph of another different correspondence sheet of the invention and a cross section enlarged at V—V line respectively.
Figure 17:
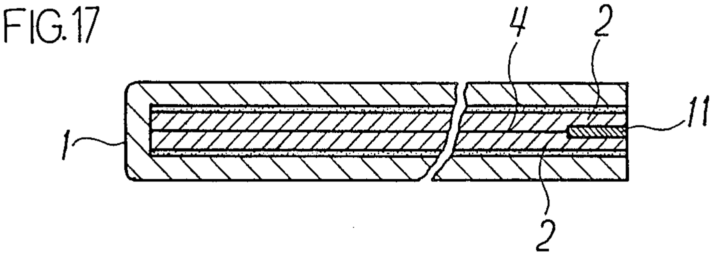

Moreover, in the correspondence sheet shown in FIG. 1 and FIG. 2, the binding layer 11, which connects the each-other-facing clear resin films at their edge part in a manner that they can hardly be peeled off, may be provided as shown in FIG. 16 and FIG. 17.

Figure 18:
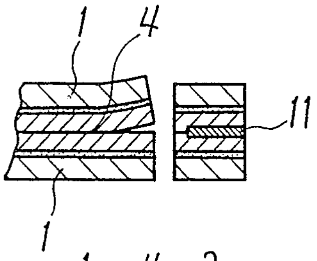
FIG. 18 is a cross section showing the state of the sheet shown in FIG. 17 at the time of peeling.
Figure 19:
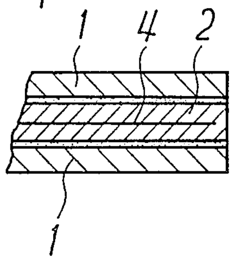
FIG. 19 is an ichnograph of the correspondence sheet which is one partly changed from the sheet shown in FIG. 17.

The binding layer 11 can be obtained, for instance, through fusion by heating of the each-other-facing clear resin films 2 or through adhesion by adhesives, etc.. This correspondence sheet will be cut, as shown in FIG. 18, along the inside line of the binding layer 11 by the receiver to get a state of being easily peelable as shown in FIG. 2. The each-other-facing clear resin films 2 may be connected, as shown in FIG. 19, by the continuous unification instead of the above-mentioned binding layer 11, in a manner that they can hardly be peeled off. It is also recommended to put the cutting mark 12 indicating the above-mentioned cutting position at the edge line of the twice-folded sheet.

Figure 20:
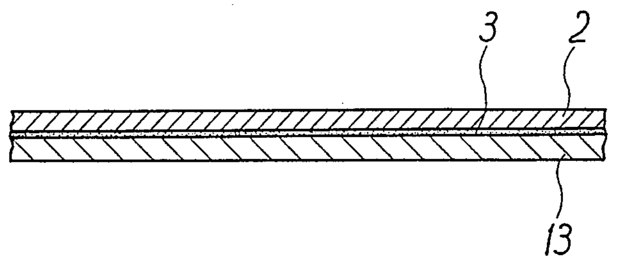
FIG. 20 (A)~(B) are cross sections showing an example of the producing method for the correspondence sheet in the order of the processing.
Figure 20:
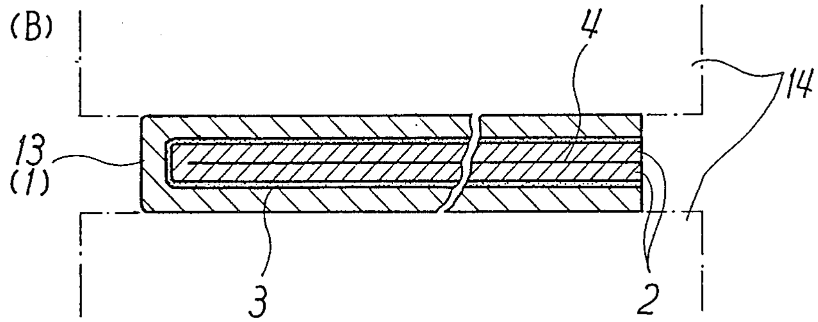

A variety of correspondence sheets shown in the above can be manufactured on a large scale by the method shown in FIG. 20 (A)~(B) for instance.

In FIG. 20 (A), clear resin film 2 is coated, via adhesive layer 3, on the surface of the feed paper 13 which displays correspondence, pictures, and other information (not indicated in the diagram) repeatedly, before the sheet is cut and is twice folded; next, as shown in FIG. 20 (B), the resin-coated sheet is twice folded, and is heat-treated by the heat roller 14 under the control of the temperature and the feeding speed; the each-other-facing clear resin films 2 thus adhere to each other via temporary adhesive layer 4, and later the twice-folded sheet is cut to a number of correspondence sheets.

As many apparently widely different embodiments of this invention may be made without departing from the spirit and scope thereof, it is to be understood that the invention is not limited to the specific embodiments thereof except as defined in the appended claims.

What I claim is:

1. Sheets for use in correspondence comprising:
   - a twice folded sheet having an edge;
   - clear resin films coated on inside each-other-facing surfaces of the twice-folded sheet in a manner that they can hardly be peeled off; and
   - a temporary adhesive layer which connects the clear resin films in a manner that the clear resin films can be later peeled apart to form a peeled surface;
   - wherein the peeled surface has no tackiness.

2. Sheets for use in correspondence as set forth in claim 1 wherein slits are cut along the edge of the twice-folded sheet with the depth from a side surface of the twice-folded sheet to the temporary adhesive layer.

3. Sheets for use in correspondence as set forth in claim 1 wherein the inside each-other-facing surfaces of the twice-folded sheet have, along the edge, a non-adhesive region where no clear resin film is coated.

4. Sheets for use in correspondence as set forth in claim 1 wherein the clear resin films are connected along the edge in a manner that they can hardly be peeled off.

* * * * *